United States Patent [19]
Johnstone

[11] Patent Number: 5,837,341
[45] Date of Patent: Nov. 17, 1998

[54] LAMINATED PRINTING SHEET

[75] Inventor: Gordon Douglas Folster Johnstone, Norscot, South Africa

[73] Assignee: Sharon Jane Johnstone, Houghron, United Kingdom

[21] Appl. No.: 676,271
[22] PCT Filed: Dec. 14, 1994
[86] PCT No.: PCT/GB94/02736
  § 371 Date: Oct. 28, 1996
  § 102(e) Date: Oct. 28, 1996
[87] PCT Pub. No.: WO95/16575
  PCT Pub. Date: Jun. 22, 1995

[30] Foreign Application Priority Data

Dec. 14, 1993 [ZA] South Africa .......................... 93/9364

[51] Int. Cl.$^6$ ...................................................... B32B 27/08
[52] U.S. Cl. ...................... 428/41.3; 428/41.5; 428/41.8; 428/41.9; 428/42.3; 156/277; 156/313; 156/323; 156/327; 156/332
[58] Field of Search .................................. 428/41.3, 41.5, 428/41.8, 41.9, 42.3; 156/277, 313, 323, 327, 332

[56] References Cited

U.S. PATENT DOCUMENTS 3,995,087 11/1976 Desanzo .
4,273,816 6/1981 Tollette .

FOREIGN PATENT DOCUMENTS

| 0 266 994 | 5/1988 | European Pat. Off. . |
| 0 458 024 A1 | 11/1991 | European Pat. Off. . |
| 0 596 547 A1 | 5/1994 | European Pat. Off. . |
| 2 068 833 | 8/1981 | United Kingdom . |
| WO 90/11183 | 10/1990 | WIPO . |

Primary Examiner—Patricia A. Short
Attorney, Agent, or Firm—Merchant, Gould, Smith, Edell, Welter & Schmidt

[57] ABSTRACT

Process for producing a composite tamper resistant product. A laminated printing sheet includes a sheet of fusible synthetic paper having an outer surface and an inner surface, the inner surface of the fusible synthetic paper being removably adhered by a partially activated adhesive to one side of a polymeric sheet. A backing sheet is adhered to the opposite side of the polymeric sheet by an adhesive. The sheet of synthetic paper and the backing sheet are discreet sheets and made of different materials. The backing sheet prevents the laminated printing sheet from distorting under the influence of heat in a printer. The synthetic sheet of paper and the partially activated heat adhesive are peeled away from the polymeric sheet so that the partially activated adhesive can adhere to a further surface, and so that the outer surface of the fusible synthetic paper can be fused to a transparent panel to prevent tampering with information applied to the outer surface of the synthetic paper.

17 Claims, 2 Drawing Sheets

LAMINATED PRINTING SHEET

INTRODUCTION TO THE INVENTION

This invention relates to a laminated printing sheet.

SUMMARY OF THE INVENTION

According to the present invention there is provided a laminated printing sheet for producing a composite tamper resistant product, the sheet including a sheet of fusible synthetic paper removably adhered by an adhesive to one side of a polymeric sheet with a backing sheet adhered to the opposite side of the polymeric sheet by an adhesive, the sheet of synthetic paper and the backing sheet being discrete sheets and being made of different materials, the synthetic paper and the partially activated adhesive in use being peeled away from the polymeric sheet so that partially activated adhesive can be adhered to a further surface, and so that the outer surface of the fusible synthetic paper be fused to a transparent panel to prevent tampering with information applied to the outer surface of the synthetic paper and covered by the fused transparent panel.

The adhesive interposed between the synthetic paper and the polymeric sheet may be a liquid-based adhesive. The liquid-based adhesive may be a water-based adhesive. The water-based adhesive may be an acrylic adhesive. The acrylic adhesive may be an ethyl butyl acrylic adhesive which is preferable grafted.

The adhesive interposed between the synthetic paper and the polymeric sheet may however be a hot melt adhesive and preferably a low melting point hot melt adhesive The adhesive interposed between the sheet of synthetic paper and the polymeric sheet is preferably partially activated.

The polymeric sheer may be biaxially orientated Preferably the surface of the polymeric sheet facing the backing sheet is modified. The surface of the polymeric sheer may be modified by corona discharge treatment. The polymeric sheet may be a sheet of polypropylene.

The adhesive interposed between the polymeric sheet and the backing sheet may be a liquid-based adhesive. The liquid-based adhesive may be a water-based adhesive. The water-based adhesive may be an acrylic adhesive. The acrylic adhesive may be a polyvinyl acetate acrylic adhesive.

The backing sheet is preferably a sheet of non-stretchable material and it may be a sheet of paper.

According to another aspect of the invention a method of producing the laminated printing sheet as described in the consistory clauses includes the step of heating the adhesive interposed between the synthetic paper and the polymeric sheet partially to activate the adhesive and to cause the polymeric sheet to adhere to the adhesive.

The method may include the prior step of forming, a sandwich consisting of the synthetic paper, adhesive, polymeric sheet, adhesive and backing sheet, and then heating the sandwich to heat the adhesive interposed between the synthetic paper and the polymeric sheet.

BRIEF DESCRIPTION OF THE DIAGRAMS

The invention will now be described, by way of example only, with reference to the accompanying diagrams wherein:

FIG. 1 is an exploded perspective view from one end of a laminated printing sheet according to the invention; and FIG. 2 is a plan view of the laminated printing sheet.

DESCRIPTION OF A PREFERRED EMBODIMENT OF THE INVENTION

Figure 1:
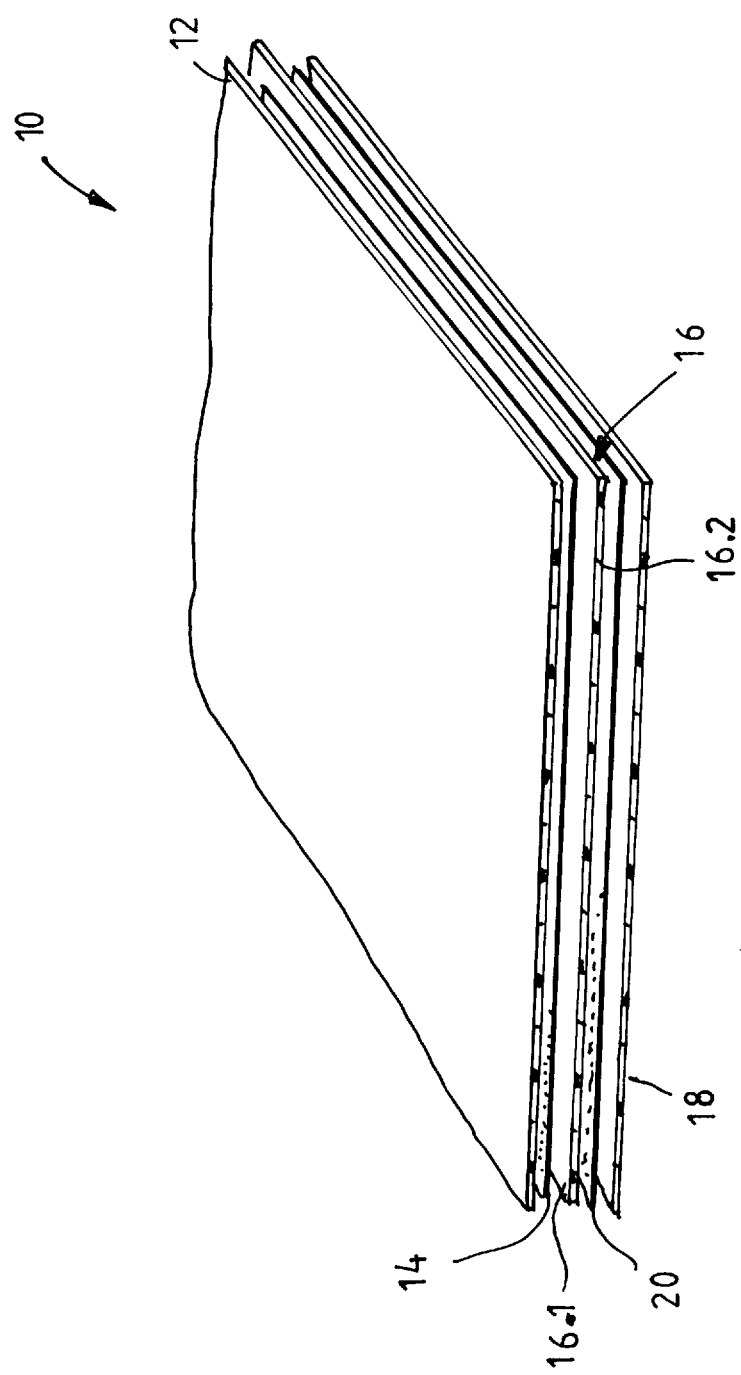
Figure 2:
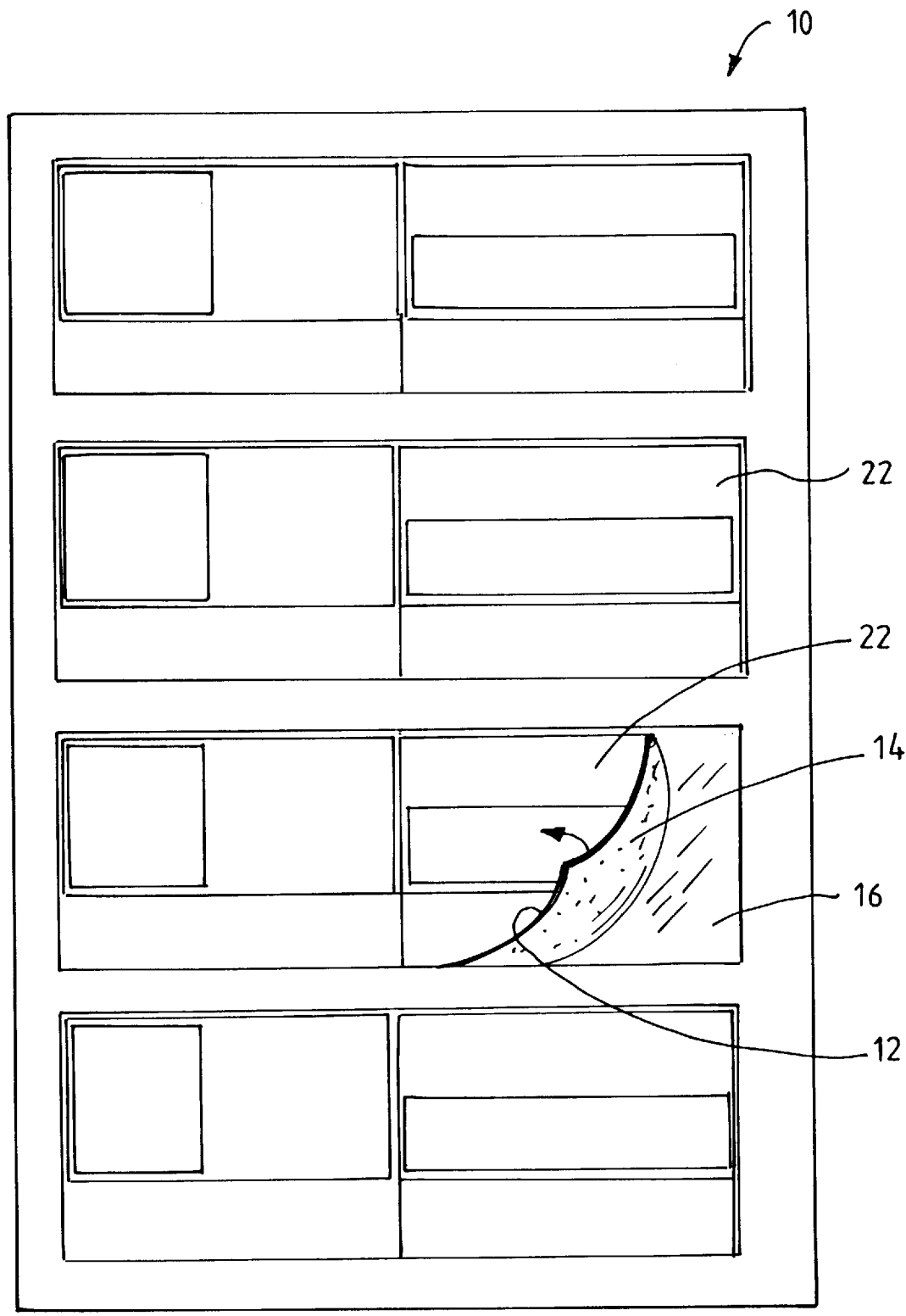

A laminated printing sheer according to the invention is designated by the reference numeral 10 in the diagrams. The laminated printing sheet 10 comprises a 250 micron thick sheet of synthetic paper 12 removably secured by a layer 14 of a heat activatable grafted ethyl butyl acrylic adhesive to one side 16.1 of a 20 micron thick, biaxially orientated polypropylene sheet 16. A sheet of baking paper 18 is secured by a layer of a water-based polyvinyl acetate acrylic adhesive 20 to the opposite side 16.2 of the polypropylene sheet 16. The backing paper 18 is 60 gram bond paper. The paper may however be between 40 and 120 gram bond paper.

The synthetic paper consists of a polymeric material which has a coating provided on it, which coating can receive print It is believed that the polymeric material component of the synthetic paper comprises at least high density polyethylene. In any event the paper is known in the trade as synthetic paper and is sold under the trade name LASERNEX which is a trade mark of GMP Korea.

The polypropylene sheet 16 is biaxially orientated by stretching longitudinally and transversely in a semi-molten state, and then cooling it while it is still in the stretched state so that the stretch remains locked in to the sheet.

The polypropylene sheet 16 is modified on the side 16.2 which faces the backing paper 18. The modified side 16.2 may be produced by corona discharge treatment. The modified side 16.2 ensures that the polypropylene sheet 16 adheres to the adhesive 20 between it and the sheet of backing paper 18.

The laminated printing sheet 10 is formed by producing a sandwich of the materials, and then feeding this sandwich through two sets of rollers, over a heated shoe interposed between the two sets of rollers. The shoe is heated to between 78° C. and 95° C. and the sandwich does not contact the shoe. The heat partially activates the grafted ethyl butyl acrylic adhesive and enables the polypropylene sheet 16 to adhere to it in such a manner that the sheet of synthetic paper 12 together with the layer 14 of the grafted ethyl butyl acrylic adhesive can easily be peeled off the polypropylene sheet 16. Once peeled off, the layer 14 of adhesive cannot be re-adhered to the polypropylene sheet 16 without the application of heat.

The grafted ethyl butyl acrylic adhesive has a softening point of ±78° C. and a melt point of ±93° C. Thus generally the adhesive itself should be heated indirectly via the shoe to a temperature of between 78° C. and 93° C. partially to activate the adhesive.

Before the synthetic paper 12 is superimposed on the polypropylene sheet 16, it may be die cut to form removable card substrates 22 therein, which may later be peeled from the polypropylene sheet 16. Preliminary printing may also be done on the upper face of the synthetic paper sheet 12. A laser, ink-jet or bubble-jet printer can be used to print onto the laminated sheet 10. When the laminated sheet 10 is subject to heat in such a printer it will not stretch or warp. Neither will the heat activatable adhesive stick to the rollers of the printer.

In use, once the removable card substrates 22 have been personalized by printing, each card substrate 22 is folded in half so hat the two layer 14 of adhesive face one another. A folded card substrate 22 is then sandwiched between two transparent panels [not shown], to form an assembly which is laminated together to form an identification card. The transparent panels consist of an outer layer of polyester co-extruded to low density polyethylene, with a grafted ethyl butyl adhesive coating on the back of the low density polyethylene. When the assembly is laminated under heat and pressure, the synthetic paper fuses the two transparent panels thereby forming an identification card which cannot be tampered with. The temperature at which this laminating process is carried out is about 145° C.

A surprising result caused by partially activating the grafted ethyl butyl acrylic adhesive, sandwiched between the synthetic paper and the polypropylene sheet, is that the synthetic paper can be bonded to security paper via the partially activated adhesive. If the adhesive is not partially activated it is not possible to bond the synthetic paper to security paper.

The bond or laminating process is achieved by heating the security paper and synthetic paper to about 145° C. under pressure. The adhesive fuses the security paper and the synthetic paper together thereby preventing the two from subsequently being separated. By laminating a transparent panel as described above onto the synthetic paper, a page or cover for a document such as a passport or identity book can be produced. Alternatively, the security paper and the synthetic paper, with its layer of adhesive facing the secret paper, can be sandwiched between two transparent panel as described above, to form a card which can be used as an identity card. The security paper is a particular type of paper which consist of wood pulp paper with various ingredients which reduce the possibility of fraud.

It will be appreciated that there are many modifications or variations of the invention without departing from the scope and sprit of the invention.

I claim:

1. A laminated printing sheet (10) for producing a composite tamper resistant product, the laminated printing sheet (10) including a sheet of fusible synthetic paper (12) having an outer surface and an inner surface, the inner surface of the fusible synthetic paper (12) being removably adhered by a partially activated adhesive (14) to one side (16.1) of a polymeric sheet (16), with a backing sheet (18) adhered to the opposite side (16.2) of the polymeric sheet (16) by an adhesive (20), which opposite side (16.2) of the polymeric sheet (16) is modified to ensure that the adhesive (20) will adhere to it, the sheet of synthetic paper (12) and the backing sheet (18) being discrete sheets and being made of different materials, the synthetic paper (12) and the partially activated adhesive (14) in use being peeled away from the polymeric sheet (16) so that the partially activated adhesive (14) can be adhered to a further surface (22), and so that the outer surface of the fusible synthetic paper (12) can be fused to a transparent panel to prevent tampering with information applied to the outer surface of the synthetic paper and covered by the fused transparent panel.

2. The laminated printing sheet of claim 1 wherein the adhesive interposed between the synthetic paper and polymeric sheet is a liquid-based adhesive.

3. The laminated printing sheet of claim 2 wherein the liquid-based adhesive is a water-based adhesive.

4. The laminated printing sheet of claim 3 wherein the water-based adhesive is an acrylic adhesive.

5. The laminated printing sheet of claim 4 wherein the acrylic adhesive is an ethyl butyl acrylic adhesive.

6. The laminated printing sheet of claim 5 wherein the ethyl butyl acrylic adhesive is a grafted ethyl butyl acrylic adhesive.

7. The laminated printing sheet of claim 1 wherein the adhesive interposed between the synthetic paper and the polymeric sheet is a hot melt adhesive.

8. The laminated printing sheet of claim 1 wherein the polymeric sheet is biaxially oriented.

9. The laminated printing sheet of claim 1 wherein the polymeric sheet is modified by corona discharge treatment.

10. The laminated printing sheet of claim 1 wherein the polymeric sheet is a sheet of polypropylene.

11. The laminated printing sheet of claim 1 wherein the adhesive interposed between the polymeric sheet and the backing sheet is a liquid-based adhesive.

12. The laminated printing sheet of claim 11 wherein the liquid-based adhesive is a water-based adhesive.

13. The laminated printing sheet of claim 12 wherein the water-based adhesive is an acrylic adhesive.

14. The laminated printing sheet of claim 13 wherein the water-based adhesive is a polyvinyl acetate acrylic adhesive.

15. The laminated printing sheet of claim 1 wherein the backing sheet is a sheet of paper.

16. A method of producing the laminated printing sheet of claim 1 including the step of heating the adhesive interposed between the synthetic paper and the polymeric sheet partially to activate the adhesive and to cause the polymeric sheet to adhere to the adhesive.

17. The method of claim 16 including the prior step of forming a sandwich consisting of the synthetic paper, adhesive, polymeric sheet, adhesive and backing sheet, and then heating the sandwich partially to activate the adhesive interposed between the synthetic paper and the polymeric sheet.

* * * * *

UNITED STATES PATENT AND TRADEMARK OFFICE
CERTIFICATE OF CORRECTION

PATENT NO. : 5,837,341
DATED : November 17, 1998
INVENTOR(S) : Johnstone

It is certified that error appears in the above-identified patent and that said Letters Patent is hereby corrected as shown below:

Column 1, line 30, insert —.— after "adhesive"

Column 1, line 33, delete "sheer" and insert —sheet—

Column 1, line 33, insert —.— after "orientated"

Column 1, line 35, delete "sheer" and insert —sheet—

Column 1, line 66, delete "sheer" and insert —sheet—

Column 2, line 13, insert —.— after "print"

Column 2, line 59, delete "layer" and insert —layers—

Column 3, line 11, delete "bond" and insert —bonding—

Column 3, line 19, delete "secret" and insert —security—

Column 3, line 24, delete "consist" and insert —consists—

Signed and Sealed this

Fourth Day of May, 1999

Attest:

Q. TODD DICKINSON

*Attesting Officer*     *Acting Commissioner of Patents and Trademarks*